United States Patent [19]

Jorda et al.

[11] Patent Number: 5,169,641

[45] Date of Patent: Dec. 8, 1992

[54] HYDROLYTICALLY DEGRADABLE POLYESTER/SILICON CO-CROSSLINKED MATRICES

[75] Inventors: Rafael Jorda, Sainte-Foy les Lyon; Hugues Porte, Caluire; Ghislaine Torres, Lyons, all of France

[73] Assignee: Rhone-Poulenc Chimie, Courbevoie, France

[21] Appl. No.: 665,578

[22] Filed: Mar. 6, 1991

[30] Foreign Application Priority Data

Mar. 8, 1990 [FR] France .............................. 90 03220

[51] Int. Cl.$^5$ .............................................. A61K 9/14
[52] U.S. Cl. ................................... 424/486; 525/431; 525/424; 525/446; 525/440; 528/28; 528/26
[58] Field of Search .............. 525/431, 424, 446, 440; 528/28, 26; 424/486

[56] References Cited

U.S. PATENT DOCUMENTS

| | | | |
|---|---|---|---|
| 4,011,312 | 3/1977 | Reuter et al. | 424/78 |
| 4,472,465 | 9/1984 | Burrill | 528/26 |
| 4,588,770 | 5/1986 | Würminghausen et al. | 525/446 |
| 4,613,641 | 9/1986 | Haubennestel et al. | 528/26 |
| 4,618,657 | 10/1986 | Katchko et al. | 525/446 |
| 4,804,691 | 2/1989 | English et al. | 523/118 |
| 4,826,946 | 5/1989 | Eichenauer et al. | 525/446 |
| 4,927,895 | 5/1990 | Nakane et al. | 528/26 |

FOREIGN PATENT DOCUMENTS

| | | |
|---|---|---|
| 0165849 | 12/1985 | European Pat. Off. |
| 2016783 | 5/1970 | France |
| 2168221 | 8/1973 | France |

OTHER PUBLICATIONS

Chemical Abstracts, vol. 68, No. 24, 1968, p. 10229, Resume No. 105798y, Columbus, Ohio, US; & JP-A-43 2949 (Daicell Co. Ltd.) Feb. 2, 1968.

Primary Examiner—Melvyn I. Marquis
Assistant Examiner—Karen A. Hellender

[57] ABSTRACT

Polyester/silicon co-crosslinked polymer substrates at least partially degradable by hydrolysis, well adopted as matrices for the controlled release of a wide variety of active agents therefrom, are prepared by controlledly co-crosslinking (a) at least one diorganopolysiloxane having at least two hydroxyl groups per molecule and (b) an oligomeric polylactic and/or polyglycolic polyester $\alpha,\omega$-diol, with an effective co-crosslinking amount of (c) an organic polyisocyanate.

9 Claims, No Drawings

HYDROLYTICALLY DEGRADABLE POLYESTER/SILICON CO-CROSSLINKED MATRICES

BACKGROUND OF THE INVENTION

1. Field of the Invention

The present invention relates to novel polyester/silicone co-crosslinked materials, a process for the preparation thereof and to the use of such co-crosslinked polymers as a matrix containing an active principle (agent) for purposes of the controlled release of such active principle by simple erosion by hydrolysis of this matrix and/or by diffusion of the active principle through the matrix before or during erosion thereof.

2. Description of the Prior Art

In controlled-release systems of the above type, the release of the active principle, which is an inorganic, organic, biochemical or vegetable substance, depends on the nature of the active principle, the matrix and the erodible character of the matrix, which determine the release profile of the active principle.

The polymers which are biodegradable and, in particular, degradable by hydrolysis and which are already known to this art principally include polyethylene cyano esters, polyamides, polyurethanes, polyacetates, polylactones, polyanhydrides, polyorthoesters and polyesters.

The silicone polymers have also long been used, in crosslinked form, as a matrix within which an active principle is dispersed.

Numerous patents describe such matrix systems (for example, U.S. Pat. No. 4,053,580 and FR-A-2,560,768).

In this type of application, the silicones are not degradable by hydrolysis and are therefore not erodible.

In addition, for pharmaceutical and biological applications, the biocompatibility of the polymer is of fundamental importance.

For these applications, it is very difficult, and sometimes impossible, to remove undesirable products, such as catalysts and residual silicone polymers not integrated into the crosslinked product, from the crosslinked silicone polymer. Finally, the use of non-degradable crosslinked silicone generally prohibits the release of a macromolecular active principle.

The use of degradable polyesters of the polylactic or polyglycolic type of their copolymers was first described for the production of biodegradable surgical suture threads (U.S. Pat. Nos. 2,703,316 and 2,758,987 and FR-A-1,425,333.)

These polyesters have also been described as a matrix for the controlled release of active principles (EP-A-171,907, U.S. Pat. Nos. 4,011,312 and 4,272,920).

For controlled-release applications, the degradable polyesters have significant advantages:

(i) they are non-toxic, as are their degradation products produced by hydrolysis, and (ii) to a certain extent, it is possible to modify the duration, the release profile of the active principle and the hydrolysis kinetics of the polymer, in particular by means of the choice of starting monomers, by means of the polymer chain length, its crystallinity, etc.

However, such polyesters have a glass transition temperature which is too high to permit the diffusion of a large number of active principles.

They frequently require high temperatures for the processing thereof which may be incompatible with the thermal stability of a large number of active principles.

SUMMARY OF THE INVENTION

Accordingly, a major object of the present invention is the provision of novel polyester/silicone co-crosslinked polymers which are at least partially degradable by hydrolysis, erodible and which have adequate mechanical properties and are easily shaped into useful active agent delivery systems.

Another object of the present invention is the provision of novel polyester/silicone co-crosslinked products which simultaneously present the advantageous properties of silicones and degradable polyesters, while at the same time avoiding, or at least ameliorating, the disadvantages thereof.

Briefly, the present invention features a polyester/silicone co-crosslinked material which is at least partially degradable by hydrolysis and comprises the product of the reaction among:

(a) at least one diorganopolysiloxane having, per molecule, at least 2 hydroxyl groups each bonded to the silicon atoms via a divalent organic radical attached, on the one hand, to the hydroxyl group and, on the other, to the silicon atom by a Si—C bond, (b) a starting polyester oligomer of the average general formula:

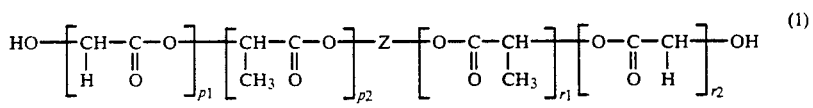

(1)

in which $p_1$, $p_2$, $r_1$ and $r_2$ are integers or fractions ranging from 0 to 10,000, inclusive, with the proviso that $r_1+r_2+p_1+p_2$ is higher than 1 and less than 10,000, and preferably ranges from 10 to 200, inclusive; Z is a divalent hydrocarbon radical of the formula: —CH$_2$—W—CH$_2$—, in which W is a straight-chain, branched or cyclic divalent saturated or unsaturated hydrocarbon radical having from 1 to 8 carbon atoms, or represents a single covalent bond (within the polyester segment of formula (1) the lactic and glycolic sequences may be distributed randomly, alternately or in blocks; W is therefore a single covalent bond or an alkylene or cycloalkylene radical such as, for example,:

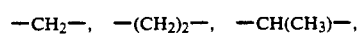

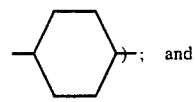

; and (c) an organic polyisocyanate.

DETAILED DESCRIPTION OF THE PREFERRED EMBODIMENTS OF THE INVENTION

More particularly according to the present invention, exemplary of the organic polyisocyanates are the organic diisocyanates of the formula:

$$O=C=N-B-N=C=O \quad (2)$$

and preferably those in which B is a divalent organic hydrocarbon radical having from 3 to 30 carbon atoms, inclusive, preferably from 4 to 20 carbon atoms, inclusive.

Exemplary of the diorganopolysiloxane (a), particularly representative are those of the average formula:

$$Y^1-\underset{R}{\underset{|}{Si}}-O-\left[\underset{R}{\underset{|}{SiO}}\right]_a-\left[\underset{\underset{OH}{\underset{|}{Y}}}{\underset{|}{SiO}}\right]_b-\underset{R}{\underset{|}{Si}}-Y^1 \quad (3)$$

in which the radicals R, which may be identical or different, are monovalent organic radicals, preferably $C_1-C_6$ alkyl, phenyl, vinyl and 3,3,3-trifluoropropyl radicals (the preferred diorganosiloxy units, because of the commercial availability thereof, are the dimethylsiloxy, methylphenylsiloxy, diphenylsiloxy and methylvinylsiloxy units); the symbols Y, which may be identical or different, are divalent organic radicals bonded to the silicon atom via a Si-C bond; preferably, the radical Y is a $C_1-C_{18}$ straight-chain or branched alkylene radical which may be extended by a polyether radical selected from among poly(ethylene oxide), poly(propylene oxide) and mixtures thereof and comprising from 1 to 50, preferably from 5 to 30, ethylene oxide and/or propylene oxide recurring units (exemplary radicals Y include $-CH_2-$, $-(CH_2)_2-$, $-(CH_2)_3-$, $-(OCH_2-CH_2)_{29}$, $-(CH_2)_3-$, $-(CH_2)_3-(CH_2)_3-[O-CH_2-CH(CH_3)]_{15}-$, $-(CH_2)_3-O-(CH_2-CH_2)-$, $-(CH_2)-CH(CH_3)-CH_2-$, $-(CH_2)_{12}-$; $Y^1$ is Y—OH or R; a is an integer or fraction ranging from 0 to 1,000, preferably from 5 to 200; and b is an integer or fraction ranging from 0 to 50, preferably from 3 to 20, with the proviso that the total number of hydroxyl groups at the end of the polymer chain and along the chain is at least 2 in the event that the polyisocyanate (c) has at least 3 isocyanate groups per molecule, and is at least 3 in the preferred event that the polyisocyanate is a diisocyanate.

Thus:

If $b=0$, the 2 $Y^1$ necessarily represent Y—OH and the polyisocyanate has at least 3 isocyanate groups per molecule, If $b=1$ and if only 1 $Y^1$ represents Y—OH, the polyisocyanate has at least 3 isocyanate groups per molecule, If $b=1$ and if the 2 $Y^1$ represent Y—OH, the polyisocyanate may be a diisocyanate, If $b=2$ and if the 2 $Y^1$ represent the radical R, the polyisocyanate has at least 3 isocyanate groups per molecule, If $b=2$ and 1 $Y^1$ represents Y—OH, the polyisocyanate may be a diisocyanate, and If $b\geq 3$ the polyisocyanate may be a diisocyanate whatever the definition of $Y^1$.

The compounds of formula (3) are known materials, certain of which are available commercially. They can be prepared, in particular, by hydrosilylation of the corresponding organohydrogenopolysiloxane with an olefinically unsaturated alcohol. A platinum hydrosilylation catalyst is advantageously used, in accordance with U.S. Pat. Nos. 2,970,150 and 4,160,775.

The processes for preparing the polyester of formula (1) are of two types: by polycondensation or by polymerization by ring opening.

The processes of this type are described in U.S. Pat. Nos. 2676,945 and 4,273,920, FR-A-1,425,333, FR-A-2,086,047, EP-A-171,907 and EP-A-172,636.

According to the polycondensation process, lactic acid, glycolic acid or a mixture of the two monomers is placed in a closed reactor in the presence of the diol of formula $HO-CH_2-W-CH_2-OH$.

The polycondensation is carried out, preferably without catalyst, by simultaneously increasing the temperature and reducing the pressure. The reaction time may range, for example, from 5 to 120 hours; the temperature may be increased from 20° C. to 220° C. and the pressure simultaneously decreased from atmospheric pressure to 0.02 KPa or below.

According to the preferred polymerization process of the present invention, cyclic dimers of lactic or glycolic acids, designated lactides or glycolides, or mixtures thereof, are reacted with the diol.

The lactide used may be optically pure L(-) lactide or racemic DL lactide.

This establishes the stereoregularity of the polylactide obtained. Thus, in the case of the L(-) lactide a semi-crystalline polymer is obtained, while with the DL lactide an amorphous polymer is prepared.

The polymerization is carried out in bulk, or in solution in the presence of a catalyst.

The conditions in respect of reaction time, temperature and pressure advantageously are as follows:

(a) reaction time ranging from 3 to 120 hours,
(b) temperature ranging from 110° C. to 180° C., and
(c) pressure below 0.5 KPa for bulk polymerization.

The molecular weight, polydispersity and crystallinity characteristics of the polymer obtained by one or the other process are controlled by the experimental conditions and the composition of the starting monomers.

Thus, a polyisocyanate having more than 3 isocyanate groups per molecule may be used as polyisocyanate (c) and, in this case, the diorganopolysiloxane (a) may have only 2 hydroxyl groups per molecule.

Particularly exemplary polyisocyanates of this type include:

(i) polymethylene poly(phenyl isocyanate) of the formula:

in which n is an integer at least equal to 1, and (ii) hexamethylene diisocyanate condensation products which may be of the biuret or trimer (isocyanurate) type and which may be represented by the formulae:

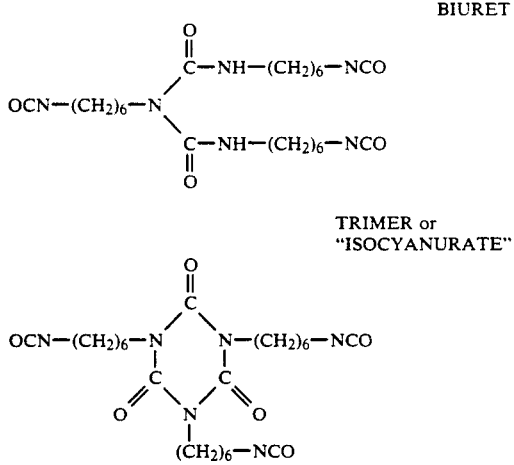

The following are particularly exemplary diisocyanate compounds of formula (2):
1,2-Diisocyanatopropane,
1,2-Diisocyanatobutane,
1,3-Diisocyanatobutane,
1,6-Diisocyanatohexane,
1,3-Diisocyanatobenzene,
1,4-Diisocyanatobenzene,
2,4-Diisocyanatotoluene,
2,6-Diisocyanatotoluene,
2,4-Diisocyanatoxylene,
2,6-Diisocyanatoxylene,
3,3'-Diisocyanatobiphenyl,
4,4'-Diisocyanatobiphenyl,
3,3'-Diisocyanatodiphenylmethane,
4,4'-Diisocyanatodiphenylmethane,
4,4'-Diisocyanato-3,3'-dimethyldiphenyl,
4,4'-Diisocyanato-3,3'-dimethyldiphenylmethane,
4,4'-Diisocyanatodiphenylethane,
3,3'-Diisocyanatodiphenyl ether,
4,4'-Diisocyanatodiphenyl ether,
3,3'-Diisocyanatodiphenyl sulfone,
4,4'-Diisocyanatodiphenyl sulfone,
3,3'-Diisocyanatobenzophenone,
4,4'-Diisocyanatobenzophenone,
3,3'-Diisocyanatodicyclohexylmethane,
4,4'-Diisocyanatodicyclohexylmethane,
1,5-Diisocyanatonaphthalene,
4,4'-Diisocyanato-3,3-dichlorobiphenyl,
4,4'-Diisocyanato-3,3'-dimethoxybiphenyl.

The preferred diisocyanates are the following:
1,6-Diisocyanatohexane,
2,4-Diisocyanatotoluene,
2,6-Diisocyanatotoluene,
2,4-Diisocyanatoxylene,
4,4'-Diisocyanatobiphenyl,
4,4'-Diisocyanatodiphenylmethane,
4,4'-Diisocyanatodiphenyl ether,
4,4'-Diisocyanatodiphenyl sulfone,
4,4'-Diisocyanatobenzophenone,
4,4'-Diisocyanatodicyclohexylethane,
1,5-Diisocyanatonaphthalene.

In the event that a diisocyanate is used as polyisocyanate (c), the diorganopolysiloxane (a) must have at least 3 hydroxyl groups per molecule.

In order to prepare the co-crosslinked product of the invention, it is recommended to carry out the process in two steps. In accordance with a first step, the polyester of formula (1) is reacted with all or part of the polyisocyanate in an organic solvent such as orthodichlorobenzene and the excess polyisocyanate is removed, if necessary. Over the course of a second step, the reaction product is reacted with the diorganopolysiloxane containing a hydroxyl group and the remainder of the polyisocyanate.

The two steps may be carried out in the presence of a catalyst which catalyzes the reaction of NCO with —OH. These catalysts comprise tertiary amines or organometallic compounds such as stannous oleate, dibutyltin dilaurate, tin bis-chelates, such as tin bis(acetylacetonate), zinc octoate and cobalt naphthenate.

In general, it is desirable to react the constituents (a), (b) and (c) in fixed proportions.

Thus, if A is the number of moles of hydroxyl groups in the polyester oligomer (b), A' the number of moles of hydroxyl groups in the diorganopolysiloxane (a) and B the number of moles of isocyanate groups in the polyisocyanate (c), it is desirable that $A+A'/B$ ranges from 0.5 to 2.

Furthermore, when the process is carried out in two steps it is desirable that, over the course of the first step, (b) is reacted with (c) in amounts such that $A/B$ ranges from 0.1 to 0.9 and, over the course of the second step, (a) is added such that $A+A'/B$ ranges from 0.5 to 2.

In the event that the polyisocyanate is a diisocyanate, it is desirable that $A+A'/B$ be close to 1, that over the course of the first step $A/B$ ranges from 0.4 to 0.6 and that over the course of the second step $A+A'/B$ ranges from 0.9 to 1.1.

In a first preferred embodiment of the invention, over the course of the first step the polyester is reacted with the polyisocyanate at a temperature ranging from 40° C. to 90° C., preferably at about 60° C., for a period of time ranging from 1 to 10 hours. Over the course of the second step, the polydiorganosiloxane is added to the reactor, in the presence of an organic solvent, at a temperature ranging from 90° C. to 110° C.

In a second preferred embodiment of the invention, over the course of the first step a molar excess of diisocyanate is reacted at a temperature ranging from 50° C. to 110° C. and, upon completion of the reaction, the excess diisocyanate is removed by any suitable means, for example by evaporation using a stirred film evaporator.

During the second step, the polysiloxane is added to the bis($\alpha,\omega$-isocyanate) polyester at a temperature ranging from 90° C. to 150° C.

The co-crosslinked products according to the invention are at least partially degradable by hydrolysis and may be formed into articles either partly or completely composed thereof which are at least partially degradable by hydrolysis.

They have mechanical properties which are sufficient to enable them to be shaped, in the form of articles degradable by hydrolysis, in any forms containing an active principle or agent, generally in an amount ranging from 0.1 to 40% by weight, which may be a medicament, a bioaffecting compound, a plant-protection compound, a vegetable embryo, a seed, a catalyst, a perfume, a cosmetic, etc.

The co-crosslinked products according to the invention therefore have mechanical properties sufficient for controlled-release applications. They may be used for the controlled release of macromolecular active principles, which is generally not possible using simple silicone polymers.

In order to further illustrate the present invention and the advantages thereof, the following specific examples are given, it being understood that same are intended only as illustrate and in nowise limitative.

EXAMPLE 1

1(a). Preparation of a Polyester of Formula

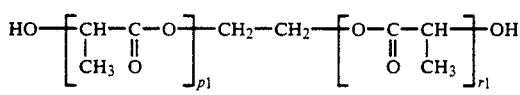

291 g of L(-) lactide, freshly recrystallized from ethyl acetate, 8.2 ml of ethylene glycol distilled under vacuum and 0.510 g of tin octanoate were charged into a 1 liter reactor. A vacuum below 0.5 KPa was established in the reactor and the mixture was then heated at 120° C. for 48 hours.

After cooling, the reaction product was dissolved in 500 ml of $CH_2Cl_2$ and then purified by running this solution into water at 65° C. with vigorous agitation. After evaporating off the solvent, 268 g of polymer, dried under vacuum, were recovered, having the following characteristics:

| | |
|---|---|
| Tg | 30° C., |
| Tm | 78° C., |
| Mn | 2,010. |
| OH group content | 0.97 equivalent per kg. |

1(b). Preparation of the Co-crosslinked Product 3.5 g of an 80%/20% by weight mixture of toluene diisocyanates of the formula:

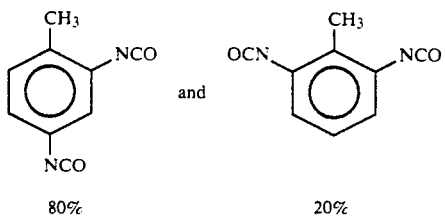

10 mol of orthodichlorobenzene and 12 μl of dibutyltin dilaurate were introduced into a 250 ml reactor.

A solution containing 80 ml of orthodichlorobenzene and 21 g of the polyester prepared in Example 1(a) was prepared in a dropping funnel. This solution was slowly introduced into the reactor at 30° C., with stirring, over the course of 1 hour, 15 minutes. The reaction mixture was then heated for 6 hours at 60° C., with stirring.

An additional 12 μl of dibutyltin dilaurate were added and 11.8 g of the oil of the formula:

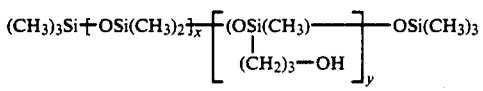

wherein x=21.6 and y=4, were introduced into the reactor.

The temperature of the mixture was progressively increased to 130° C, over the course of 30 minutes. The solvent was evaporated under a reduced pressure of 0.133 KPa and crosslinking was completed at the same temperature under the same reduced pressure over the course of 15 hours.

The mixture was permitted to cool and a hard, solid product, which was the polyester/silicone crosslinked product, was recovered.

The yield by weight was higher than 90%.

The degree of swelling was 2.77.

EXAMPLE 2

The procedure of Example 1 was repeated exactly, except that 46.1 g of polydimethylsiloxane oil were added, in which x=150 and y=3.25.

The solid crosslinked product obtained was an elastomer.

Yield by weight >90%

Degree of swelling: 6.1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polyester/silicone co-crosslinked polymer substrate at least partially degradable by hydrolysis, comprising (a) at least one diorganopolysiloxane having, per molecule, at least 2 hydroxyl groups each linked to silicon atoms via a divalent organic radical bonded both to such hydroxyl group and to a silicon atom by a Si—C bond; and (b) a polyester oligomer having the average formula:

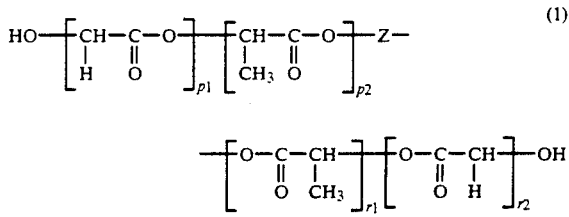

(1)

in which $p_1$, $p_2$, $r_1$ and $r_2$ are integers or fractions ranging from 0 to 10,000 inclusive, with the proviso that $r_1+r_2+p_1+p_2$ is higher than 1 and less than 10,000, and Z is a divalent hydrocarbon radical of the formula: —$CH_2$—W—$CH_2$—in which W is a straight-chain, branched or cyclic divalent saturated or unsaturated hydrocarbon radical having from 1 to 8 carbon atoms, or a single covalent bond; said at least one diorganopolysiloxane and said polyester oligomer having been co-crosslinked by means of an effective amount of (c) an organic polyisocyanate, with the proviso that when said polyisocyanate is a diisocyanate, the diorganopolysiloxane (a) has at least 3 hydroxyl groups per molecule.

2. The co-crosslinked polymer substrate as defined by claim 1, said polyisocyanate (c) comprising an organic diisocyanate of the formula:

(2)

in which B is a divalent organic hydrocarbon radical having from 3 to 30 carbon atoms.

3. The co-crosslinked polymer substrate as defined by claim 1, said diorganopolysiloxane (a) having the average formula:

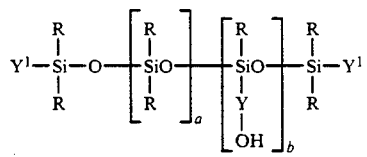

in which the radicals R, which may be identical or different, are monovalent organic radicals; the symbols Y, which may be identical or different, are divalent organic radicals linked to the silicon atom via a Si—C bond; $Y^1$ represents Y—OH or R; a is an integer or fraction ranging from 0 to 1,000; and b is an integer or fraction ranging from 0 to 50, with the proviso that the total number of hydroxyl groups at the ends of the polymer chain and along the chain is at least 2 in the event that the polyisocyanate (c) has at least 3 isocyanate groups per molecule, and at least 3 in the event that the polyisocyanate is a diisocyanate.

4. The co-crosslinked polymer substrate as defined by claim 1, wherein formula (1), $r_1+r_2+p_1+p_2$ ranges from 10 to 200.

5. The co-crosslinked polymer substrate as defined by claim 2, wherein formula (2), B has from 4 to 20 carbon atoms.

6. The co-crosslinked polymer substrate as defined by claim 3, wherein formula (3), a ranges from 5 to 200 and b ranges from 3 to 20.

7. The co-crosslinked polymer substrate as defined by claim 1, having an active agent distributed therethrough.

8. A controlled-release shaped article comprising the co-crosslinked polymer substrate as defined by claim 7.

9. The co-crosslinked polymer substrate as defined by claim 1, wherein the effective amount of the organic polyisocyanate used is such that if A is the number of moles of hydroxyl groups in the polyester oligomer, A' is the number of moles of hydroxyl groups in the diorganopolysilixane, and B is the number of moles of isocyanate groups in the polyisocyanate, then (A+A')/B ranges from 0.5 to 2.

* * * * *